Feb. 21, 1956   R. A. HOLMBERG   2,735,511
INTERNAL-COMBUSTION ENGINE SPARK ARRESTOR
Filed Dec. 31, 1953   2 Sheets-Sheet 1

INVENTOR
RUDOLPH A. HOLMBERG
Paul O. Pippel
ATTORNEY

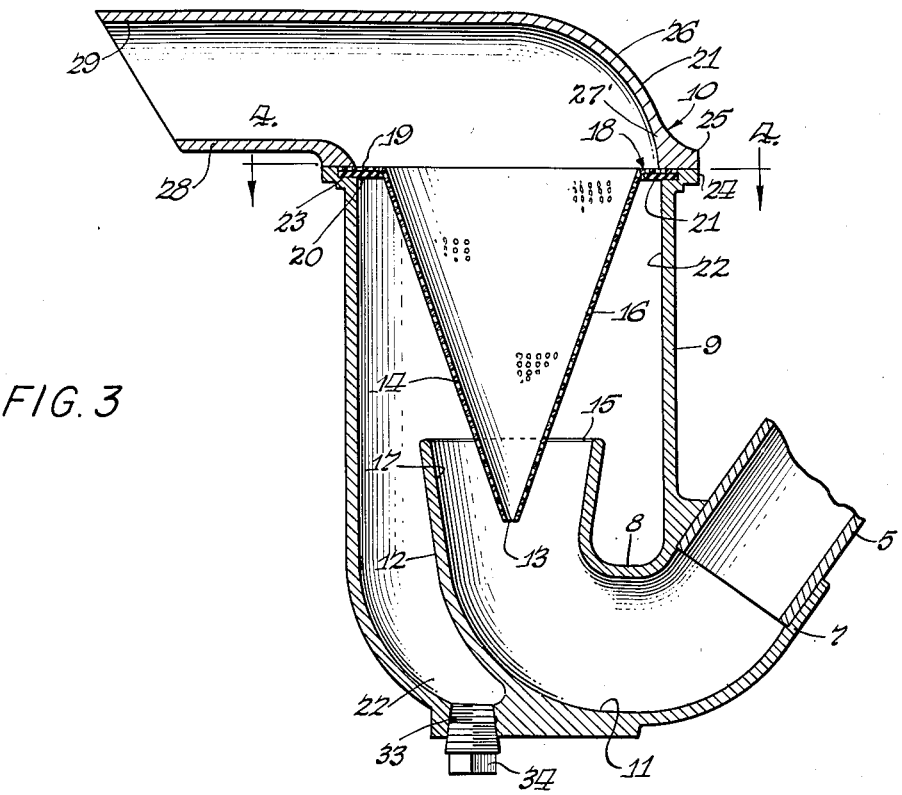
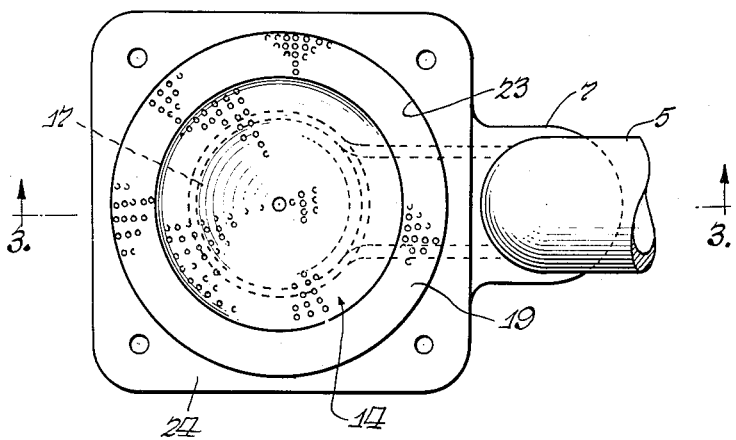

United States Patent Office 2,735,511
Patented Feb. 21, 1956

2,735,511

INTERNAL-COMBUSTION ENGINE SPARK ARRESTOR

Rudolph A. Holmberg, Chicago, Ill., assignor to International Harvester Company, a corporation of New Jersey Application December 31, 1953, Serial No. 401,587

1 Claim. (Cl. 183—72)

This invention relates to spark arrestors for internal combustion engines.

A general object of the invention is to provide a novel, simple and efficient spark arrestor which will develop minimum back pressures and which is of relatively small dimension so that it may be applied to existing units without encumbrance.

A more specific object of the invention is to devise a spark arrestor incorporating a screen baffle with a directed manifold discharge so arranged as to abrade hot carbon particles against the screen baffle to reduce their size and thus obtain an effective thermal dissipation to cool the particles.

The invention further comprehends provision of a novel spark arrestor comprising a vertical housing structure having an inlet adjacent to its bottom end and an outlet at its upper end and a screen baffle structure disposed intermediate its ends and the baffle structure formed and arranged to provide an abrasion surface for carbon particles which are directed thereagainst from the inlet to reduce their size and the baffle structure further providing an imperforate surface area against which the larger particles are caused to impinge and fall back to the bottom of the housing.

These and other objects of the invention will become more apparent from the specification and drawings wherein:

Figure 3 is a vertical sectional view through the spark arrestor taken substantially on the line 3—3; and Figure 4 is a plan view of the spark arrestor with the upper portion removed.

Figure 1:
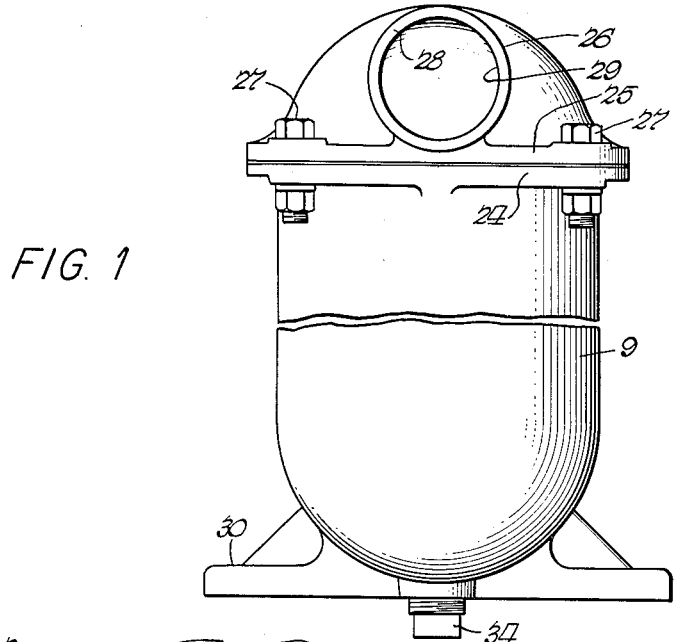
Figure 1 is a fragmentary side perspective view of a tractor showing the exhaust manifold and the novel spark arrestor carried by the tractor and connected to the exhaust manifold.

Describing the invention in detail, the same is shown in association with a tractor generally designated 2 which comprises an internal combustion engine 3 with an exhaust manifold 4 connected to an exhaust pipe 5 which is covered with asbestos lining 6, the outlet end of the pipe 5 is tightly telescoped into the inlet portion 7 of the inlet pipe 8 which is formed integral with, and projects through, the lower end of a cylindrical body portion 9 of the spark arrestor housing generally designated 10. The inlet 7 extends diagonally and upwardly through one side of the cylindrical body portion 9 and leads into an arcuate intermediate downwardly curved section 11 which forms the bend of a U in the pipe 8 and curves upwardly into an outlet portion 12 which is centered within the lower portion of the casing 9, the portion 12 being directed upwardly and frusto-conically shaped with an upward flare in order to effect lateral dispersion of the gases and entrained carbon particles issuing into the casing 9.

The frusto conical portion 12 receives centered and radially spaced therein the apex 13 of a conical baffle screen member 14, said screen having its pointed end 13 within the upper portion of the discharge segment 12 of the inlet pipe 8 disposed intermediate the ends of the body portion 9 of the housing, and the screen 14 has a diameter at its pointed end portion substantially smaller than that of the opening 15 at the upper end of the pipe portion 12. The baffle or screen 14 provides a conical peripheral surface 16 which has a more acute pitch than the internal frusto-conical surface 17 of the outlet end portion 12 of the pipe 8. The relationship between the surfaces 16 and 17 is such that a projection of the surface 17 intersects the surface 16 whereby the carbon particles are directed angularly against the surface 16 for abrasion therealong as the particles are carried from the tip end 13 of the screen to the base end 18. The base end of the inverted cone shaped screen is provided with an outturned flange portion 19 which rests on top of an imperforate metallic ring 20 which circumscribes the base end of the screen 14, said base end being of a diameter substantially lesser than the diameter of the casing 9 and the ring 20 providing a downwardly facing stop surface 21 which extends inwardly from the inner periphery 22 of the casing and serves to provide a positive obstruction to large particles of material which ride up the entire length of the surface 16 of the screen without being sufficiently pulverized. The surface 21 thus provides a rebound area for these large igneous particles which are adapted to drop into the well portion 22 at the bottom of the casing and surrounding the inlet pipe 8.

The outer margins of the ring 20 and the outturned flange 19 are recessed within a groove 23 formed in the upper end of the housing portion 9 and are circumscribed by a peripheral outturned flange portion 24 which mates with a complementary flange portion 25 of an outlet pipe 26 which tops the body portion 9 and is secured thereto in clamping relationship to the screen flange 19 and the ring 20 by a plurality of nut and bolt assemblies 27, 27 passing through registering openings in the flanges 24 and 25. It will be seen that the outlet pipe 26 is somewhat L shaped and that its one leg 27' which forms the cap for the housing opens downwardly through the screen and that its other leg 28 extends generally horizontally and has an exhaust open end 29.

Figure 2:
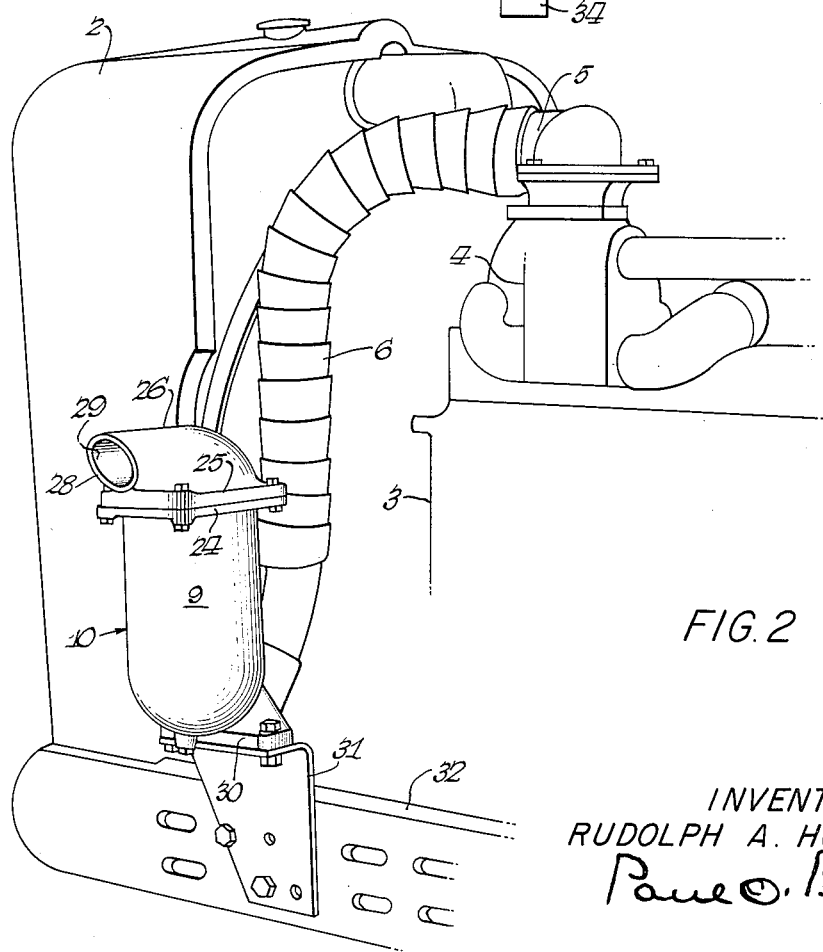
Figure 2 is a broken apart side view of the spark arrestor.

In operation, the exhaust gases issuing from the manifold pass through the pipe 5 and are directed downwardly into the U-shaped inlet pipe whereby the carbon particles and the like are caused to impinge against the sides of the portion 11 and then are blown upwardly against the screen 14. The greater portion of the carbon particles and the like will pulverize while traveling along the periphery 16 and pass through the screen upwardly out through the outlet pipe 26. The large particles will strike the surface 20 of the baffle and drop into the well 22. It will be seen from a consideration of Figures 2 and 3 that the bottom end of the casing 9 is provided with a mounting plate portion 30 which is shown in Figure 2 secured to a bracket 31 which is in turn connected to a side sill portion 32 of the tractor. The closed bottom 30 is provided with a cleanout or blowout opening 33 closed with a plug 34 normally threaded therein. The plug 34 is periodically removed and the engine operated at slow speed whereupon the sediment in the well 22 is blown out. Thereafter the plug 34 is replaced and the spark arrestor operates as hereinbefore described.

What is claimed is:

In a spark arrestor for an internal combustion engine, a housing having an upright hollow cylindrical body portion with a closed bottom, an inlet pipe integral with said body portion and extending through a side thereof at said bottom and provided with an inlet portion adapted for connection to the exhaust manifold of an associated internal combustion engine and extending diagonally upwardly from the bottom of said casing, said pipe further having an intermediate downwardly curved portion integral with said bottom and disposed within the lower end of said housing and merging at one end with said inlet portion, said pipe further having an integral upwardly flaring outlet portion extending upwardly from the other end of said intermediate portion in substantially centered relation to the interior of said housing and forming a well thereabout with the sides of the housing at the bottom thereof, said intermediate portion providing an impinging surface for spark particles athwart the direction of movement of gases from said inlet portion and into said outlet portion, said outlet portion terminating in an upwardly open upper end intermediate the ends of said body portions of the housing, a conical screen baffle having a lower pointed end within said upper end of said outlet portion in substantially centered radially spaced relation thereto, said baffle extending from said pointed end within said body portion in substantially centered relation thereto and terminating at the upper end of said body portion in an upper wide base of a diameter less than that of said housing and having at said base an outturned flange portion overlapping the upper edge of said body portion, an imperforate baffle ring circumscribing said screen baffle at said base and positioned beneath said flange portion and having a surface facing downwardly into said body portion and seated about its outer periphery upon the upper edge of said body portion and providing a surface area extending radially inwardly from the interior periphery of said body portion to the periphery of said conical baffle, and an exhaust pipe connected at one end to said flange portion and clamping said ring with the upper end of said body portion and having a horizontally extending outlet portion providing a particle impinging surface extending athwart the direction of flow of gases from said body portion; said outlet portion having a frusto-conical surface of a pitch slightly less than that of said conical baffle and oriented to guide particles entrained in the gases issuing from said outlet portion against said conical baffle in an area intermediate its bottom end and upper base at an extremely acute angle thereto to effect a sliding action by the particles along the baffle.

References Cited in the file of this patent

UNITED STATES PATENTS

| | | |
|---|---|---|
| 1,037 | Briscoe | Dec. 15, 1838 |
| 369,483 | Tyner | Sept. 6, 1887 |
| 1,680,243 | Becker | Aug. 7, 1928 |
| 1,831,805 | Donaldson | Nov. 17, 1931 |
| 2,242,278 | Yonkers | May 20, 1941 |

FOREIGN PATENTS

| | | |
|---|---|---|
| 641,143 | France | Apr. 10, 1928 |